United States Patent [19]

Sawicki

[11] Patent Number: 5,557,477
[45] Date of Patent: Sep. 17, 1996

[54] APPARATUS FOR AND METHOD OF CORRECTING FOR ABERRATIONS IN A LIGHT BEAM

[75] Inventor: Richard H. Sawicki, Pleasanton, Calif.

[73] Assignee: The United States of America as represented by the United States Department of Energy, Washington, D.C.

[21] Appl. No.: 133,399

[22] Filed: Oct. 8, 1993

[51] Int. Cl.⁶ .................................................. G02B 5/08
[52] U.S. Cl. ........................ 359/846; 359/847; 359/868
[58] Field of Search ............................ 359/838, 846, 359/848, 849, 847, 868, 875, 881, 847, 872; 248/604, 634

[56] References Cited

U.S. PATENT DOCUMENTS

| | | | |
|---|---|---|---|
| 3,659,930 | 5/1972 | Groneberg et al. | 359/847 |
| 4,043,644 | 8/1977 | Humphrey | 359/846 |
| 4,059,346 | 11/1977 | Levine et al. | 359/847 |
| 4,119,366 | 10/1978 | Lemaître | 359/847 |
| 4,355,350 | 10/1982 | Mader | 359/869 |
| 4,494,830 | 1/1985 | Grainge et al. | 359/876 |
| 4,548,482 | 10/1985 | Williams, Jr., et al. | 359/847 |
| 4,647,164 | 3/1987 | Sawicki et al. | 359/849 |
| 4,664,488 | 5/1987 | Sawicki et al. | 359/849 |
| 4,691,093 | 9/1987 | Banas et al. | 219/121 LC |
| 4,734,557 | 3/1988 | Alfille et al. | 359/849 |
| 4,773,748 | 9/1988 | Shih et al. | 359/846 |
| 4,932,768 | 6/1990 | Gobeli | 359/849 |
| 5,089,915 | 2/1992 | Gobeli | 359/846 |
| 5,102,214 | 4/1992 | Steele, et al. | 359/847 |
| 5,109,300 | 4/1992 | Waddell | 359/847 |
| 5,123,625 | 6/1992 | Spaltofski | 248/634 |
| 5,160,112 | 11/1992 | Pritchard et al. | 248/604 |
| 5,229,889 | 7/1993 | Kittell | 359/846 |

FOREIGN PATENT DOCUMENTS

| | | | |
|---|---|---|---|
| 2343262 | 9/1977 | France | 359/846 |
| 4138557 | 3/1993 | Germany | 359/846 |
| 0245105 | 10/1986 | Japan | 359/846 |
| 5157903 | 6/1993 | Japan | 359/846 |

*Primary Examiner*—Paul M. Dzierzynski
*Assistant Examiner*—John Juba, Jr.
*Attorney, Agent, or Firm*—Robert M. Padilla; William C. Daubenspeck; William R. Moser

[57] ABSTRACT

A technique for adjustably correcting for aberrations in a light beam is disclosed herein. This technique utilizes first means which defines a flat, circular light reflecting surface having opposite reinforced circumferential edges and a central post and which is resiliently distortable, to a limited extent, into different concave and/or convex curvatures, which may be Gaussian-like, about the central axis, and second means acting on the first means for adjustably distorting the light reflecting surface into a particular selected one of the different curvatures depending upon the aberrations to be corrected for and for fixedly maintaining the curvature selected. In the embodiment disclosed, the light reflecting surface is adjustably distorted into the selected curvature by application of particular axial moments to the central post on the opposite side from the light reflecting surface and lateral moments to the circumference of the reflecting surface.

11 Claims, 4 Drawing Sheets

APPARATUS FOR AND METHOD OF CORRECTING FOR ABERRATIONS IN A LIGHT BEAM

GOVERNMENT RIGHTS

The United States Government has rights in this invention pursuant to Contract No. DE-AC03-76SF00098 between the U.S. Department of Energy and the University of California.

FIELD OF THE INVENTION

The present invention relates generally to techniques for bending planar surfaces and more particularly to a specific technique for correcting for astigmatism in a light beam reflected off a light reflecting surface by adjustably bending the surface in a selected manner.

BACKGROUND OF THE INVENTION

It is not uncommon for astigmatism to develop in a light beam passing through an optical system. A known way to correct for this astigmatism is to reflect the beam off of a mirrored surface which has a slight convex or concave cylindrical configuration in the appropriate direction relative to the incident axis of the beam's astigmatism. The degree of curvature depends upon the amount of astigmatism in the beam. FIG. 1 illustrates means 10 defining a cylindrical light reflecting surface 12 having a radius of curvature r. The axis of the cylinder including surface 12 extends normal to the axis of the incident beam 14 (into the plane of the paper). The degree of curvature of surface 12, that is, the size of radius r, and whether the surface is convex relative to the incoming beam as illustrated by solid lines or concave (as shown by dotted lines), depends upon the amount of astigmatism in beam 14 which is to be corrected (if at all). If the beam displays no astigmatism at all, surface 12 would be entirely flat.

The discussion of FIG. 1 immediately above assumes that the astigmatism in beam 14 could be predetermined. As a result, means 10 defines a fixed surface 12. In some cases, it is not possible to predetermine the astigmatism to be corrected for and therefore it is not possible to provide the appropriately curved light reflecting surface ahead of time. In FIG. 2 there is illustrated an apparatus generally indicated by the reference numeral 16 for adjustably bending a light reflecting surface 18 into a particular cylindrical shape whose radius can be selected depending upon the astigmatism to be corrected. As seen in FIG. 2, the surface 18 is defined by a bendable plate like member 20 including rearwardly extending spaced-apart ribs 22, 24 and 26. The apparatus also includes a mechanism 28 including gripping members 30, 32 and 34 for gripping ribs 22, 24, and 26, respectively, in order to support the overall plate like member in the position illustrated. The upper and lower gripping members 30 and 34 are fixed and therefore retain the ribs 22 and 26, and therefore, the upper and lower edges of surface 18, in fixed positions. At the same time, gripping member 32 is movable back and forth, to a limited extent, in the direction of two way arrow 36, that is, normal to surface 18 and along a line through the center of the light reflecting surface. Means including the motor 38 or any other suitable drive mechanism is provided for moving the gripping member 32 in the manner just recited, in a controlled fashion, in order to bend surface 18 to a desire curvature depending upon the amount of astigmatism of the light beam being reflected off of surface 18. FIG. 3 diagrammatically illustrates the way in which plate 20 is acted upon in order to bend surface 18.

The overall apparatus 16 just described is known in the art. While such an apparatus provides an in line technique for adjusting the curvature of a light reflecting surface for astigmatism, the push-pull approach utilized does not result in a purely cylindrical shape that is, in mathematical terms, proportionate to $X^2$ (for small curvatures) where X is measured perpendicular to the cylinder's axis in the plane of the reflecting surface. Rather, the push-pull action at the center of the surface to be bent, as in the apparatus illustrated in FIG. 2, produces a sizeable term, generally proportionate to $|X|^3$ which, of course, is not cylindrical at all. In addition the loading technique produces some random warping because the loading is not determinate when the deflections are small ('1 micron).

A second type of device for adjusting the curvature of a light reflecting surface is described in an article entitled "Three-Actuator Deformable Water-Cooled Mirror" by Anthony Fuschetto of the Perkin-Elmer Corporation published in OPTICAL ENGINEERING/March/April, 1981/ Vol. 20. No. 2. The device described there uses three piezoelectric stacks connected to six distinct points along the edges of a circular mirror. Each of these stacks applies a force between an associated pair of these points, generally parallel to the mirrored surface, thereby applying a bending moment to the mirror for bending the latter.

The Fuschetto approach just described is a more accurate way to obtain a cylindrical contour on a mirror for correcting for astigmatism than the approach illustrated in FIGS. 2 and 3. However, even the Fuschetto design does not provided for accurately uniformly contouring the mirrored surface along its entire extent. A primary reason for this is that the mirrored surface is arcuate (circular) and each piezoelectric stack concentrates its application of force to distinct points on the edge of the mirrored surface.

Two additional deformable rectangular mirror assemblies are disclosed in two U.S. patents in which the inventor of the design disclosed herein is a co-inventor. Those patents are U.S. Pat. No. 4,647,164 issued Mar. 3, 1987, and U.S. Pat. No. 4,664,488 issued May 12, 1987.

In U.S. Pat. No. 4,647,164, the work piece, on one surface of which a mirror surface is ground, has a configuration when viewed from the side that resembles the letter "E" with the three legs of the "E" extending across the back of and away from the mirror surface. In this design the mirror surface is selectively bent by pushing or pulling along the full width of the top and bottom legs of the "E" with those forces being substantially parallel to the mirror surface when it is in the relaxed, flat state.

The design of U.S. Pat. No. 4,664,488 includes a first plurality of posts which extend perpendicularly from the back surface of the mirror. There is also a second plurality of actuators each interfacing with selected combinations of two or three of those posts to either push or pull toward or away from each other or collectively in the same general direction to cause the surface of the mirror to take on the desired cylindrical shape.

In each of the designs discussed above, the cylindrical shape assumed by the surface of the mirror is the inverse of the resulting shape on the rear surface of the mirror. Those types of mirrors typically use piezo electric crystals for actuation which gives them very minimal travel and can deform the mirror only a few microns. Additionally, these types of deformable mirrors are typically very expensive.

SUMMARY OF THE INVENTION

In view of the foregoing, it is an object of the present invention to provide a technique for adjustably distorting a light reflecting surface, to a limited extent, into varying amounts closely approximating selected curvatures.

A more particular object of the present invention is to provide an in-line apparatus for correcting for aberrations in a light beam reflected off of a light reflecting surface utilizing the technique recited immediately above.

Another particular object of the present invention is to provide an uncomplicated and yet reliable apparatus which can be designed for adjustably bending a light reflecting surface into a Gaussian-like curvature.

Still another particular object of the present invention is to provide an apparatus which relies on axial and lateral forces being applied to the work piece with the reflecting surface a part thereof to adjustably distort the light reflecting surface into Gaussian-like curvatures.

As will be seen hereinafter, the overall technique disclosed herein for correcting for aberrations in a light beam utilizes first means having a flat, light reflecting front surface and a contoured back surface, with the first means being resiliently distortable, to a limited extent, into different curvatures with the possible ones of said curvatures being determined by the contour of said back surface, and a second means acting on the first means for adjustably distorting the light reflecting surface into a selected curvature to correct for the aberration of the light beam.

Additional objects, advantages and novel features of the present invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE FIGURES

The technique just recited briefly will be described in more detail hereinafter in conjunction with the drawings wherein.

DESCRIPTION OF THE PREFERRED EMBODIMENT

Reference will now be made in detail to preferred embodiments of the present invention, examples of which are illustrated in the accompanying drawings. While the invention will be described in connection with these preferred embodiments, it will be understood that it is not intended to limit the invention to those embodiments. On the contrary, it is intended to cover all alternatives, modifications and equivalents as may be included within the spirit and scope of the invention as defined by the appended claims.

As will be seen in the following discussion of the various figures, the present invention presents a deformable mirror element that can correct optical aberrations which can be described by a Gaussian distribution, i.e. $Z = e^{-ar^2}$ where:

Z is the optical path distortion;

a is a constant; and r is the distance from the center of the circular mirror.

Figure 2:
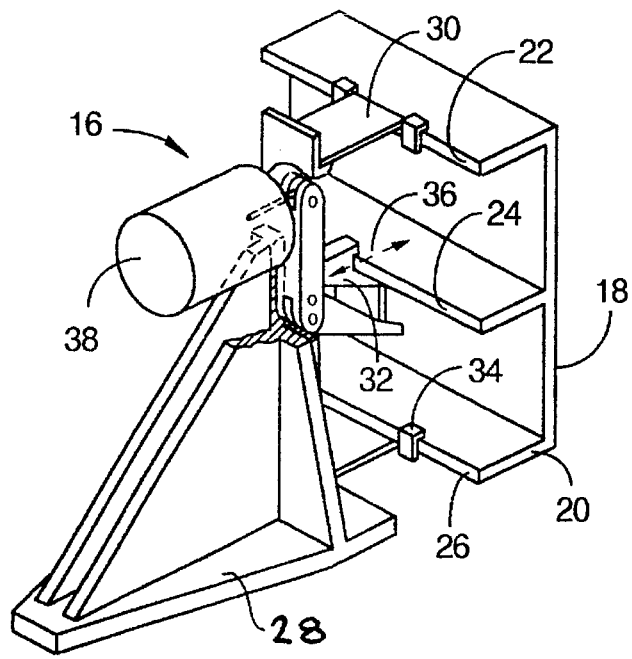
FIG. 2 is a perspective view of an apparatus of the prior art for correcting for astigmatisms in a light beam using an adjustably bendable light reflecting surface.
Figure 1:
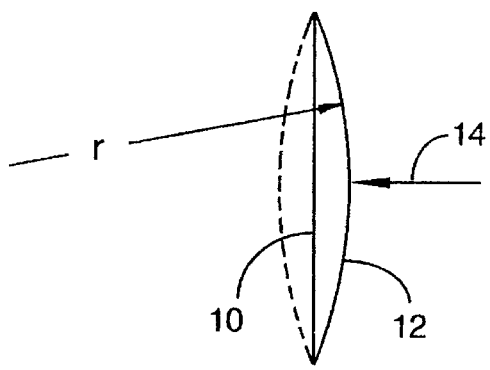
FIG. 1 is a cross-sectional view of means defining a fixed light reflecting surface which illustrates how the light reflecting surface corrects for an astigmatism in a light beam reflected off of that surface.
Figure 3:
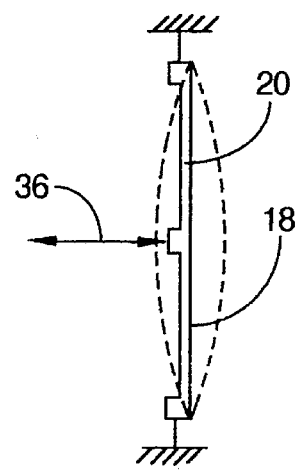
FIG. 3 diagrammatically illustrates how the apparatus of FIG. 2 operates.
Figure 4A:
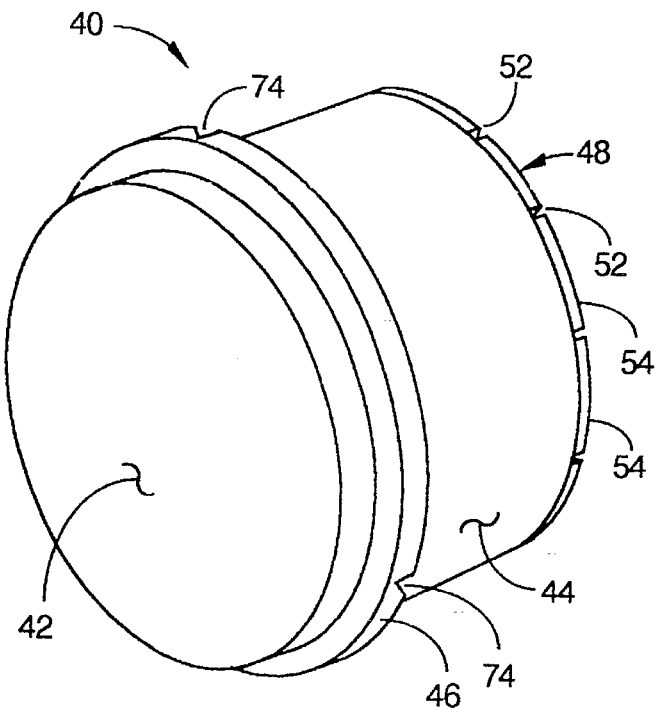
FIG. 4A is a perspective view of a member which defines a light reflecting surface, from the perspective of the reflecting surface, and which forms part of an overall apparatus designed in accordance with the present invention for correcting for astigmatism in a light beam reflected off of a light reflecting surface defined by the member.
Figure 4B:
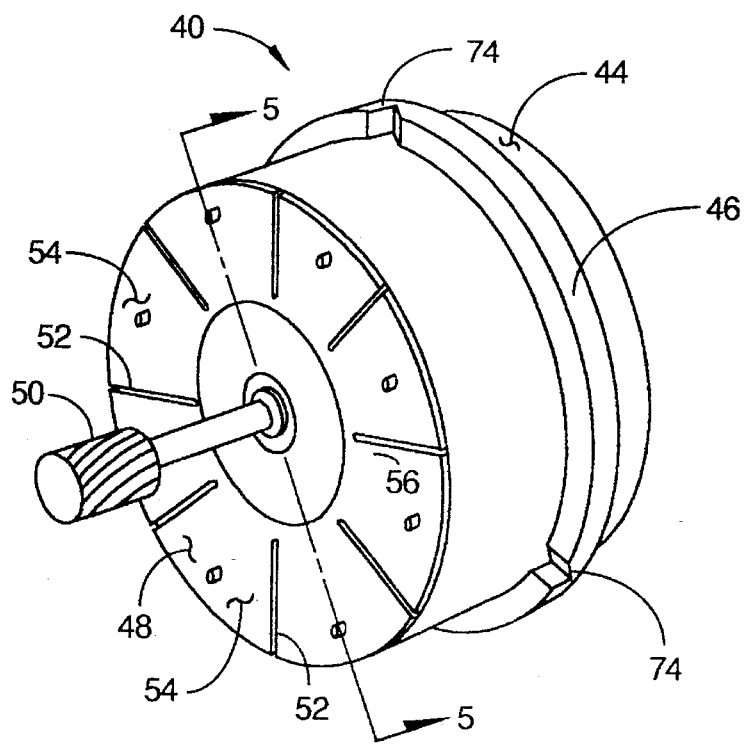
FIG. 4B is a perspective view of the member of FIG. 4A from the perspective of the adjustment side.

Turning now to the drawings, wherein like components are designated by like reference numerals throughout the various figures, attention is immediately directed to FIGS. 4A and 4B, since FIGS. 1–3 were discussed previously. There is illustrated in FIGS. 4A and 4B an integrally formed generally cylindrical body member 40 having a front face 42 defining a flat circular light reflecting surface, or mirror. Extending rearward from front face 42 is the cylindrical side wall 44 with a circular mounting flange 46 extending radially outward therefrom. Enclosing the back side the body member 40 is a circular plate 48 with a dimple 56 formed therein with the central region of dimple 56 being substantially parallel to the front face 42 when in the unstressed, or relaxed, state. Circular plate 48 also has a plurality of equally spaced slots 52 cut radially inward from the outer circumference approximately one-third of the distance to the center of plate 48 to form equally sized petals 54 in the sloping portion of dimple 56. Additionally, each of petals 54 is rigidly affixed to the outer edge of the rear surface of cylindrical side wall 44. Further, there is a micrometer-like actuation device 50 mounted to, and extending through, the center of plate 48 and the center of dimple 56, which when turned causes surface 42 to bend selectively which will be better understood by referring to FIG. 5.

Figure 5:
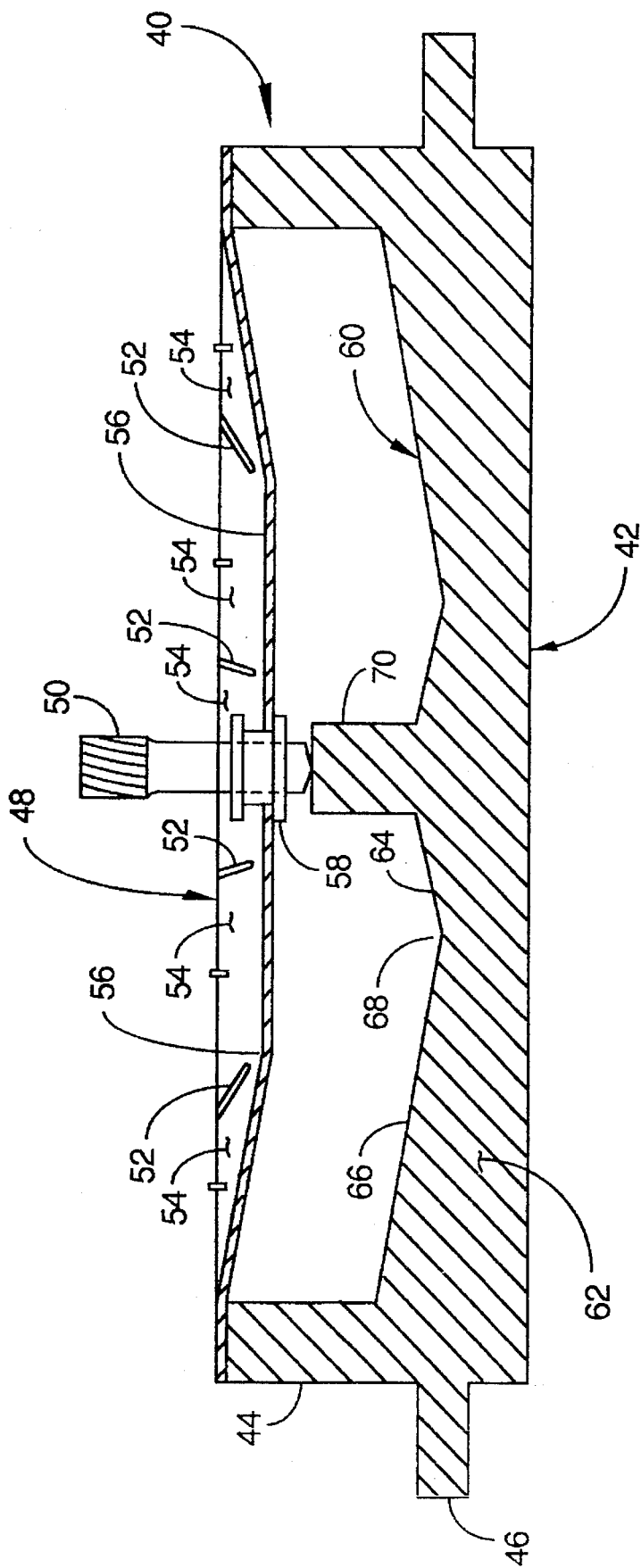
FIG. 5 is a side sectional view of the member of FIGS. 4A and 4B, taken generally along line 5—5 in FIG. 4B.

FIG. 5 is a cross-sectional view of body member 40 and circular back plate 48 taken along line 5—5 in FIG. 4B. In this view dimple 56 in plate 48 is clearly shown, as is the contoured interior shape of body member 40. Rotatably mounted in the center of plate 48 at the deepest extent of dimple 56, is micrometer assembly 50 which is retained in place through plate 48 by retaining ring 58.

The cross-section of body member 40 shows the flat exterior mirror surface 42 and circular mounting flange 46 that extends radially outward from the outer surface of cylindrical side wall surface 44. The interior of body member 40 is defined by the cylindrical side wall portion 44 extending substantially perpendicularly away from mirror surface 42. Contained within the inner region thus defined by side wall 44 is a contoured inner surface 60 with a centrally located post 70 extending rearward from inner surface 60. The front portion 62 of the body portion 40 defined by mirror surface 42 and contoured inner surface 60 is of varying thickness along the radius of body member 40 which results from inner surface 60 being divided into sections 64 and 66. The first section 64, starting at the outer circumference of post 70, slopes toward mirror surface 42 as it extends away from post 70, outward toward side wall 44 to a point 68. From point 68 the second section 66, as it continues outward toward side wall 44, slopes away from mirror surface 42 with front portion 62 thickening toward cylindrical side wall 44. Thus, creating the thinnest point in front portion 62 at each point 68 in a circle that is centered around center post 70.

The assembly is completed by attaching each of petals 54 to the flat rear surface of cylindrical side wall 44 with dimple 56 extending into the interior of body member 40 with the end of the micrometer-like actuation device 50 interfacing with the rear surface of central post 70.

In operation, as the micrometer-like actuation device 50 is advanced it pushes on central post 50, in opposition to circular plate 48, with mirror surface 42 taking on a convex curvature. It can be seen that the convex curvature of mirror surface 42 increases as the center post of micrometer-like actuation device 50 advances and further displaces central post 70 from circular plate 48. Similarly, if the tip of micrometer-like actuation device 50 is rotatably affixed to center post 70, center post 70 can also be drawn toward circular plate 48 resulting in mirror surface 42 taking on a concave curvature as front portion 62 is drawn away from the static position where micrometer-like actuation device 50 is neither pulling or pushing on center post 70.

Also, circular plate 48 could be made without dimple 56, however, plate 48 would be subject to more flexure as micrometer-like actuation device 50 pushes or pulls on post 70. By adding central dimple 56 to plate 48 and since plate 48 is slotted the actuator, acting through the petals 54 of plate 48, will apply axial and radial forces to side wall 44. Generation of both axial and radial forces are necessary for the proper operation of this configuration.

From experimentation it has been discovered that by moving the thinnest point 68 of front portion 62 closer to or further away from center post 70 the resulting curvature in the center of mirror 42 when flexed can be made sharper or flatter. Thus, if the circle formed by points 68 is moved closer to center post 70, the peak of the curve assumed by mirror 42 when flexed becomes sharper. Conversely, if the circle formed by points 68 is moved further away from center post 70 the peak of the curve assumed by mirror 42 when flexed becomes broader.

For a particular application a deformable mirror of the configuration of the present invention was built with a nominal diameter of mirror surface 42 of 2 meters and about 18.7 cm thick at the center. The taper of inner surface 60 extended from a point 68, about 26 cm from the center of center post 70 and had a slope of about 0.14. The material was glass with a low thermal expansion coefficient. The ratio of the radial force applied to side wall 44 to the axial force applied to post 70 was 15/4 for the sample described above. These loads were applied to the free end of post 70 with the distance from that point to mirror face 42 was approximately 38.5 cm. There are an infinite number of other loads possible, however, they must provide the same bending moment and shear load distribution throughout the mirror volume in order to produce the same shape.

Figure 6A:
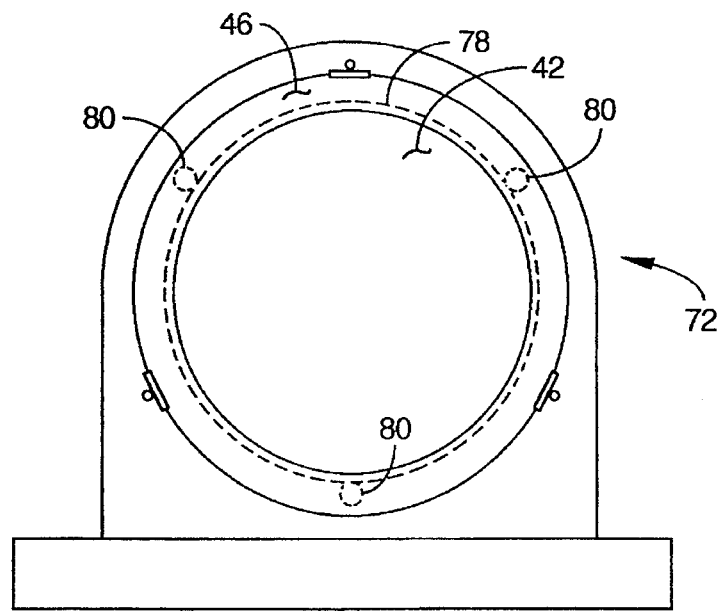
FIGS. 6A and 6B are a frontal and a side view, respectively, of the mirror assembly of the present invention installed in a mounting base.
Figure 6B:
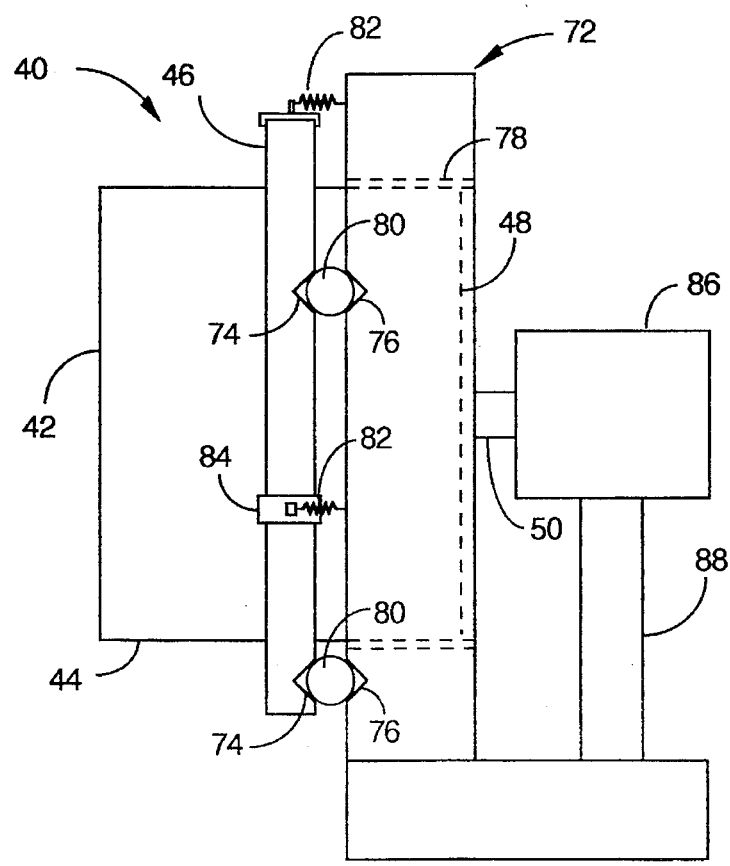

Referring next to FIGS. 6A and 6B there is shown a mounting base 72 with a circular central opening 78 in the upright portion for receiving the rear portion of assembled mirror 40 to be supported therein. When so installed, circular mounting flange 46 extends outward parallel to the front face of the upright portion of mounting base 72. The type of mounting shown in FIGS. 6A and 6B is a three point kinematic mounting with three equally spaced, radially, conical sockets 74 (see also FIGS. 4A and 4B) formed in the rear side of circular mounting flange 46, and three mating equally spaced, radially, conical sockets 76 in the upper portion of the front face of mounting based around the circumference of central opening 78. Then a ball bearing 80 is located in each pair of opposing conical sockets 74 and 76 causing the rear surface of circular mounting flange 46 to be spaced-apart from the face of mounting base 72. To retain mirror assembly 40 and mounting base 72 in this configuration there are three compression springs 82, one spring between each mating pair of conical sockets 74 and 76, to draw those two units toward each other. In FIG. 6B a spring mounting clip 84 can be seen on flange 46 and a similar clip (not shown) is used to attach the other end of spring 82 to central opening 78 in mounting base 72.

FIG. 6B also illustrates the automation of the adjustment of the curvature of mirror surface 42 by means of a servo-motor 86 that is also affixed to mounting base 72 with the rotor connected micrometer-like actuation device 50. The curvature of mirror surface 42 can thus be controlled remotely by a computer forming the appropriate signals to servo-motor 86 for the desired resultant curvature of mirror surface 42.

The present invention requires only one actuator, unlike some of the deformable mirror devices of the prior art. The body of the present invention is of a single piece of material with the front surface ground to a flat reflective surface. The back side of the main body of the present invention is contoured to be thin nearer the center and thick around the outer edge. Thus, the body of the present invention can be made with a simple machining operation that does not have to be precise. The main body on which the mirror is formed is a monolithic piece of an appropriate material for the intended use and environment, such as glass, aluminum, etc.

While the shape on the back of the main body is not precise (i.e. there is not a wavelength relationship to the thicknesses, etc.), the shape was carefully determined in order to cause the front mirror surface to take a Gaussian shape. In order to do so it is necessary to apply a load to the edge, as well as to the middle of the back surface. Thus, by turning the micrometer an axial load is applied to the center of the mirror that deforms the surface, and, since the main body is cylindrically shaped a lateral load is generated to the outer circumference of the mirror.

This is an example of the concept of the present invention for generating an asprit shaped mirrored surface by machining the back surface of the mirror, rather than the front as has been done in the prior art.

The foregoing description of the preferred embodiments of the present invention have been presented for purposes of illustration and description. It is not intended to be exhaustive or to limit the present invention to the precise form disclosed, and obviously many modifications and variations are possible in light of the above teaching. The embodiments were shown and described in order to best explain the principles of the present invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. Apparatus for correcting for aberrations in a light beam comprising:

a generally cylindrical, resiliently distortable body having
      a first end with a light reflecting outer surface and a contoured inner surface having a center portion, a cylindrical side wall extending rearward from the contoured inner surface, and a second open end, said contoured inner surface being disposed opposite said light reflecting outer surface;

an actuator for applying axial force to the center portion of the contoured inner surface; and means for coupling said actuator to said cylindrical side wall so that actuating said actuator to apply axial force to the center portion of the contoured inner surface also provides inward radial forces between said actuator and said side wall, said means for coupling comprising a circular plate coupled at its center to the actuator and coupled at its periphery to the open end of the generally cylindrical, resiliently distortable body, and said circular plate including a plurality of slots extending radially inward from the side wall forming a plurality of petals.

2. The apparatus as recited in claim 1 wherein the circular plate includes a central dimple portion.

3. The apparatus as recited in claim 2 wherein the contour of the contoured inner surface is defined by at least a selected first curve that causes a cross-section of the portion of the resiliently distortable body between the light reflecting outer surface and the contoured inner surface to decrease in thickness as the first curve extends radially inward toward the center portion of the contoured inner surface.

4. The apparatus in claim 3 wherein the contour of the contoured inner surface is further defined by a selected second curve that causes the cross-section of the portion to decrease in thickness as the second curve extends radially outward toward the side wall of the cylindrical body until the second curve intersects the first curve in substantially a circle that is co-axial with the center of the contoured inner surface and the side wall of the cylindrical body, with the cross sectional portion of smallest breadth being defined by the intersection circle.

5. The apparatus as recited in claim 4 wherein at least the first curve is a straight line.

6. The apparatus as recited in claim 4 wherein the first curve and second curve are each a straight line whereby the radial distance of the intersection circle determines the sharpness of the peak of a substantially Gaussian curvature assumable by the light reflecting outer surface in order to correct for Gaussian aberrations.

7. The apparatus as recited in claim 1 further including a substantially centered post disposed in the center portion of the contoured inner surface in contact with said actuator to convey the axial force from said actuator to the contoured inner surface.

8. The apparatus as recited in claim 1 wherein the contour of the contoured inner surface is defined by at least a selected first curve that causes a cross-section of the portion of the resiliently distortable body between the light reflecting outer surface and the contoured inner surface to decrease in thickness as the first curve extends radially inward toward the center portion of the contoured inner surface.

9. The apparatus in claim 8 wherein the contour of the contoured inner surface is further defined by a selected second curve that causes the cross-section of the portion to decrease in thickness as the second curve extends radially outward toward the side wall of the cylindrical body until the second curve intersects the first curve in substantially a circle that is co-axial with the center of the contoured inner surface and the side wall of the cylindrical body, with the cross sectional portion of smallest breadth being defined by the intersection circle.

10. The apparatus as recited in claim 9 wherein at least the first curve is a straight line.

11. The apparatus as recited in claim 9 wherein the first curve and second curve are each a straight line whereby the radial distance of the intersection circle determines the sharpness of the peak of a substantially Gaussian curvature assumable by the light reflecting outer surface in order to correct for Gaussian aberrations.

* * * * *